(12) United States Patent
Baader

(10) Patent No.: US 9,989,753 B2
(45) Date of Patent: Jun. 5, 2018

(54) CENTROSYMMETRIC CHANGER FOR OPTICAL ELEMENTS

(71) Applicant: Thomas Baader, Mammendorf (DE)

(72) Inventor: Thomas Baader, Mammendorf (DE)

(73) Assignee: Thomas Baader, Mammendorf (DE)

(*) Notice: Subject to any disclaimer, the term of this patent is extended or adjusted under 35 U.S.C. 154(b) by 0 days. days.

(21) Appl. No.: 15/009,863

(22) Filed: Jan. 29, 2016

(65) Prior Publication Data

US 2017/0219816 A1 Aug. 3, 2017

(51) Int. Cl.
G02B 26/00 (2006.01)
G02B 7/00 (2006.01)
G02B 7/16 (2006.01)
G02B 7/20 (2006.01)
G02B 7/24 (2006.01)
G02B 7/14 (2006.01)

(52) U.S. Cl.
CPC .......... *G02B 26/008* (2013.01); *G02B 7/006* (2013.01); *G02B 7/14* (2013.01); *G02B 7/16* (2013.01); *G02B 7/20* (2013.01); *G02B 7/24* (2013.01); *G02B 26/007* (2013.01)

(58) Field of Classification Search
CPC .... G02B 26/008; G02B 7/006; G02B 26/007; G02B 7/14; G02B 7/16; G02B 7/20; G02B 7/24
USPC .................................................. 359/889, 616
See application file for complete search history.

(56) References Cited

U.S. PATENT DOCUMENTS

| 3,868,714 | A | * | 2/1975 | Muryoi | G03B 19/12 |
| | | | | | 359/889 |
| 7,561,014 | B2 | * | 7/2009 | Johnson | H01F 7/066 |
| | | | | | 335/177 |
| 2009/0108684 | A1 | * | 4/2009 | Long | G02B 7/005 |
| | | | | | 310/36 |

FOREIGN PATENT DOCUMENTS

EP 3203296 A1 * 8/2017 ........... G02B 26/008

* cited by examiner

*Primary Examiner* — Zachary Wilkes
*Assistant Examiner* — George G King

(57) ABSTRACT

This invention minimizes the needed space for a changer device for optical elements which can be mounted in front or in the back or on either fork side of telescopes. It implements a design whose profile is circular and centrosymmetric and gravitanionally neutral in respect to the path of light of the surrounding optical devices as well as an optimized mechanical depth. This is achieved by moving the centrosymmetrically arranged optical elements individually into the optical path i.e. the central opening of the changing device in contrary to prior art designs wherein the optical elements are mounted on a revolving disk whose axis of rotation is not congruent with the optical axis. The invention minimizes the obstructing area and shape of the changing device as well as the gravitational stress on surrounding structures by incorporating a design with minimal space requirements.

8 Claims, 9 Drawing Sheets

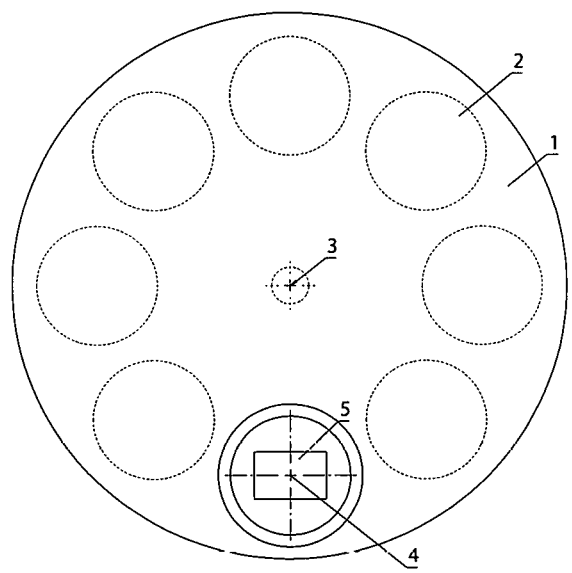
(a)
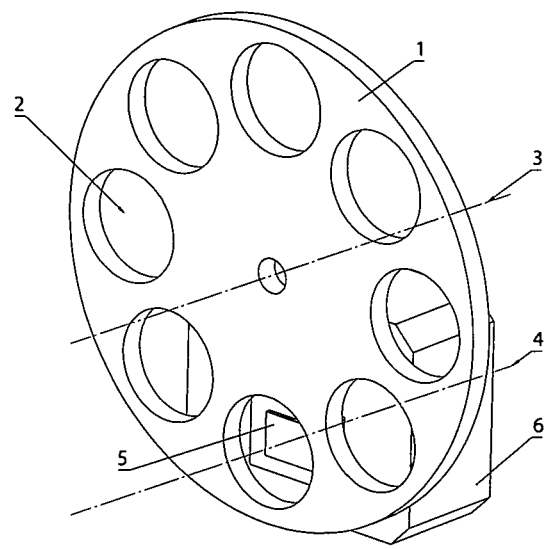
(b)
Figure 1: -Prior Art-

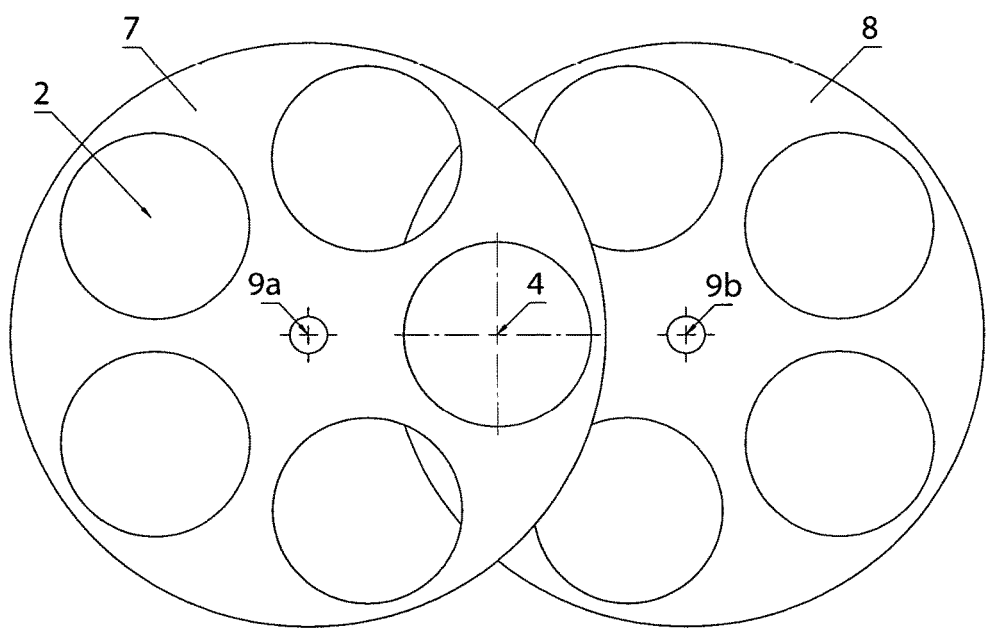
Figure 2: -Prior Art-

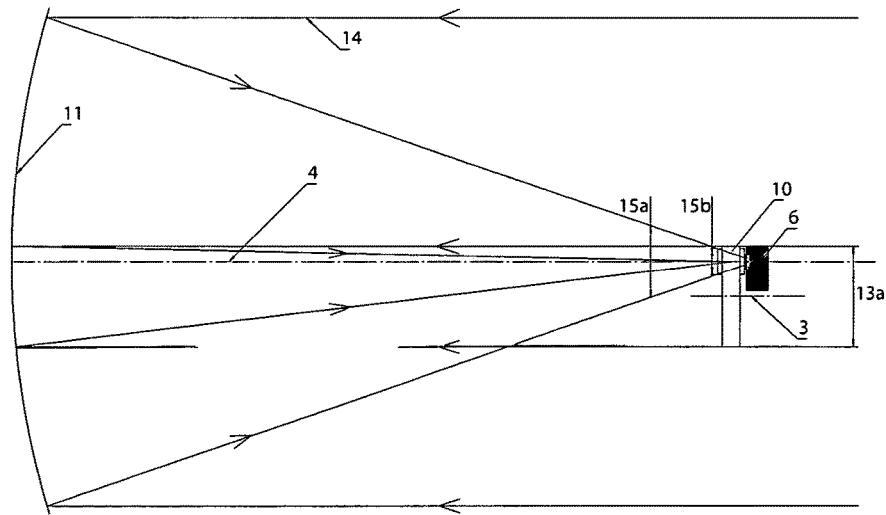
(a) -Prior Art-
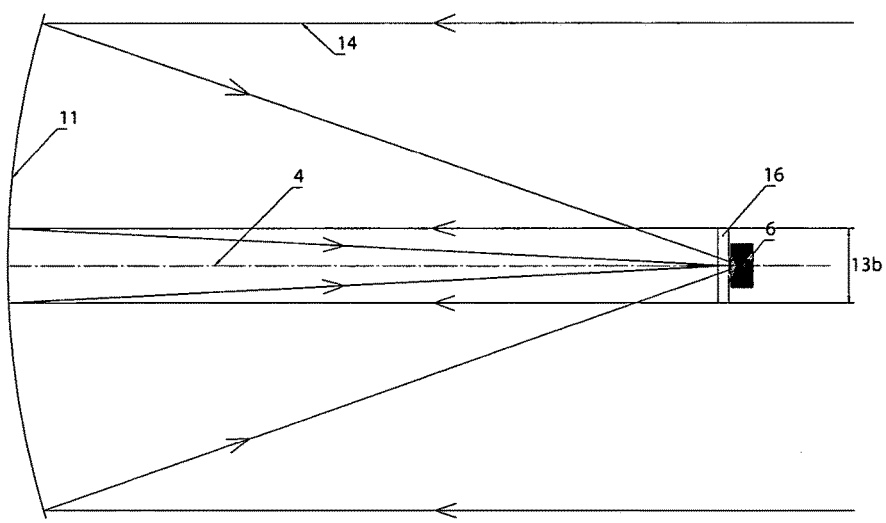
(b)
Figure 3

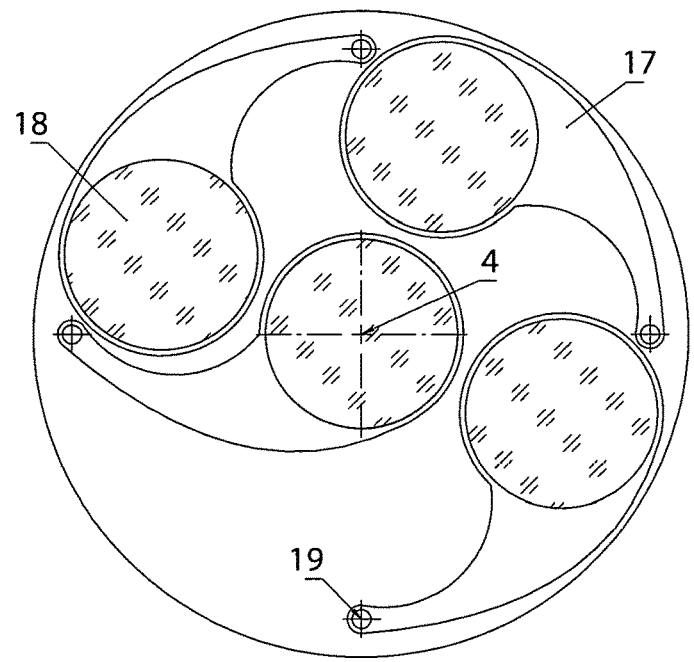
(a)
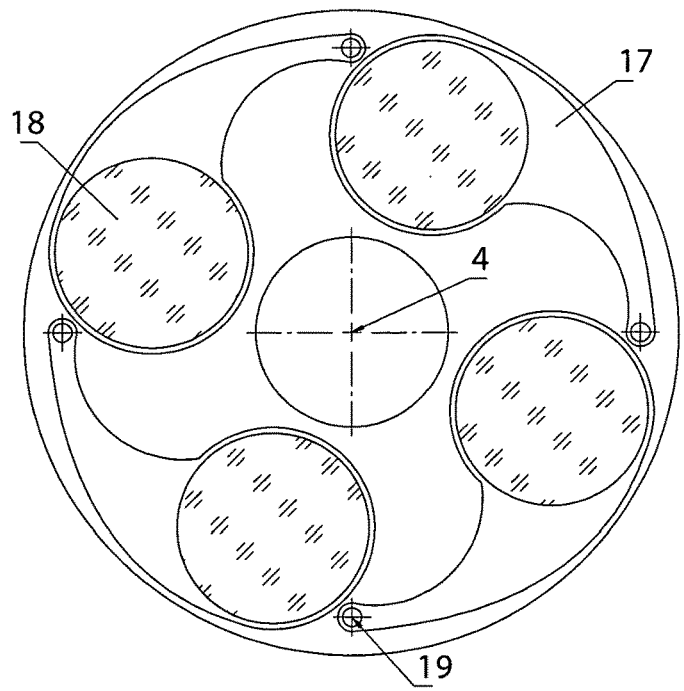
(b)
Figure 4

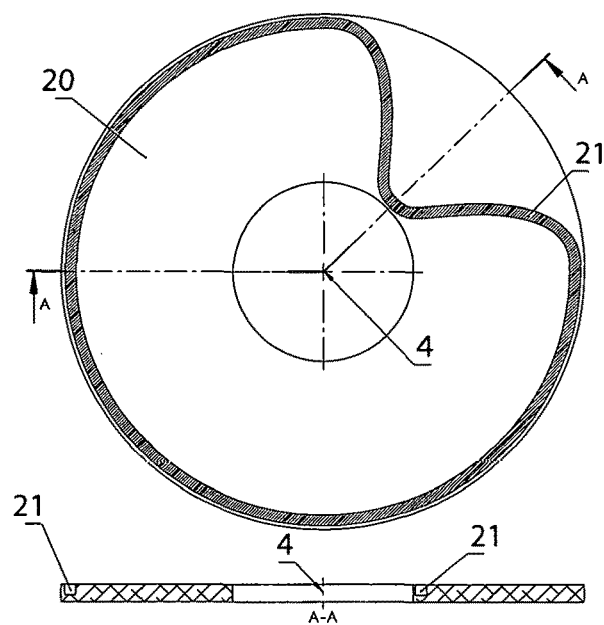
(a)
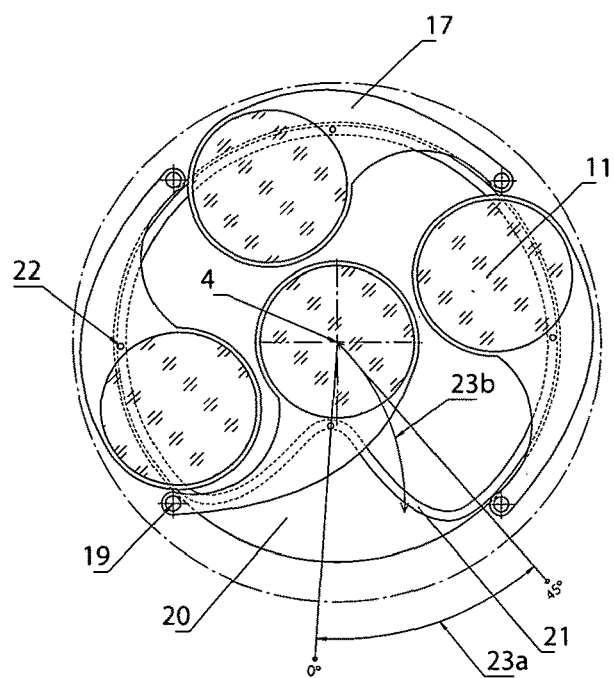
(b)
Figure 5

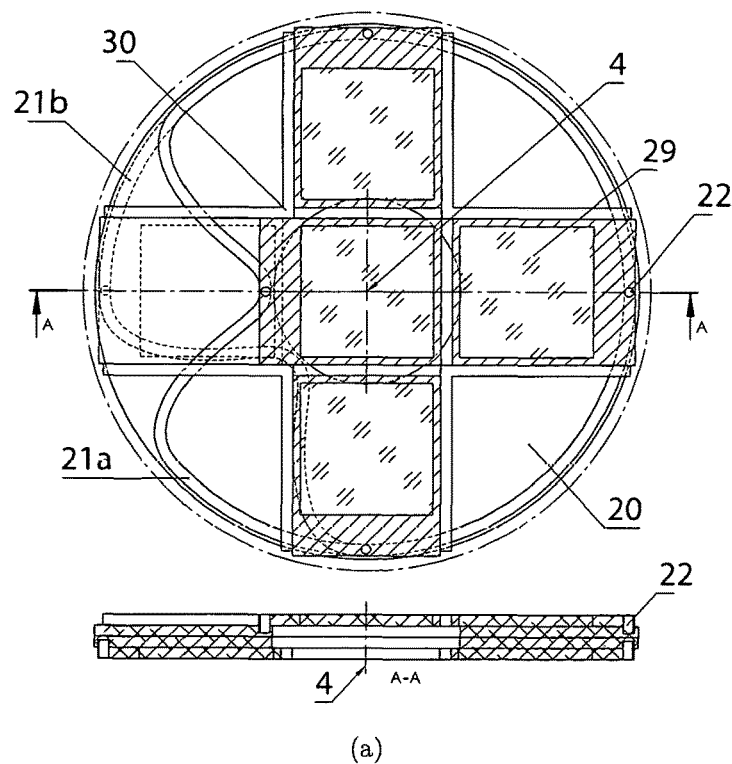
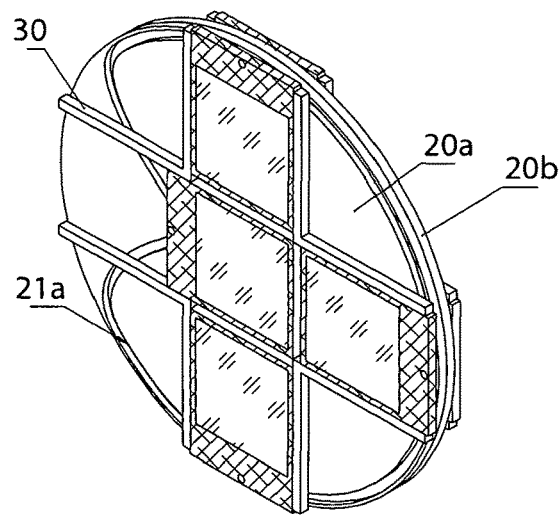
Figure 9

CENTROSYMMETRIC CHANGER FOR OPTICAL ELEMENTS

FIELD OF INVENTION

The present invention belongs in the field of adjusting means of optical elements. It relates to optical systems for visual observation and in particular optical systems with attached image capture device or suchlike. A typical application is to serve as a filter wheel, winch is being mounted in the optical path of a telescope in front of an image capture device or eye piece in order to transmit only a desired part of the incoming light's spectrum.

CONVENTIONS USED IN THIS DOCUMENT

A usual convention used for describing optical systems is using a carthesian coordinate system wherein the z-axis is the rotational axis of symmetry of an optical system and optical elements at the intersections with the z-axis are described in the x-y-plane. In this document the z-axis is referred to as the axis of symmetry of the optical system and thus the direction of light propagation. Angles are denoted in radians.

BACKGROUND OF THE INVENTION

Prior art of optical element changing devices are so called filter wheels comprise a set of optical filters mounted on a disk which moves them into the light path of attached optical devices by revolving. In order to achieve this, the prior art filter wheel's rotational axis is usually parallel but decentered (offset in x-y-plane) in respect to the path of light (z-axis) of the surrounding optical system, the filter wheel is embedded in (FIG. 1). An example of a prior art filter wheel can be found in U.S. Pat. No. 6,567,225 B1.

There are widely used optical systems which impose that the filter wheel must be placed in front of the telescope, thus causing obstruction of the incoming light. Prime-focus telescopes for instance are such systems. (FIG. 3).

Prior art filter wheel designs possess certain shortcomings for such applications as follows:

a) When installed in front of telescopes (FIG. 3a), prior art filter wheels cause substantial obstruction of the incoming light because of their proportionally large diameter depending on the number of housed filters. This results in a decreased image quality because of the reduction of the overall incoming light as well as less contrast and resolution of the image.

b) Moreover the obstruction caused is not centrosymmetric in respect to the telescope's optical axis (FIG. 3a) which reduces the image quality of the whole field of view by uneven deformation of the observed objects.

c) By not being centered in respect to the overall optical systems light path (z-axis), the center of gravity is also decentered which causes unsymmetrical mechanical stress of the surrounding support structures. When capturing data while the overall optical system (usually a telescope with attached filter wheel and image capture device) is moving (in respect to the surrounding field of gravity) in order to follow the object of interest, the uneven mechanical load causes a certain deflection of the support structures. This results in a deformation of the observed object's image.

d) Furthermore it is vital for direct-driven telescope mounts to be balanced in directions perpendicular to the field of gravity. With prior art filter wheels, this can only be achieved by using additional counterweights which further increases the overall mechanical load.

e) Prior art filter wheels need an opening or respectively an empty holder for optical elements for the passing through of light without any interaction with one or more of the housed optical elements.

f) Prior art so-called 'centered filter wheels' do not overcome these problems. These filter wheels use two overlapping filter wheels to produce a symmetric obstruction. But by not being circular they still cause an unsatisfactory high amount of light obstruction. Furthermore this design implies that every rotary disk must have au empty holder or respectively an opening which cannot be used for mounting optical elements ill order to enable the passing through of light without any interaction with one or more optical elements housed. An example of a prior art centered filter wheel is the 'CenterLine Dual Color Filter Wheel' by the company 'Finger Lakes Instrumentation'. FIG. 2 depicts such a centered filter wheel.

What is needed is a circular as well as centrosymmetric (also referred to as point-symmetric) filter changer design in respect to the light path of attached optical devices (z-axis), winch minimizes the overall obstruction per filter as well as the obstructing shape (this is ideally a perfect circle) as well as having a centered point of gravity.

OBJECTS OF THE INVENTION

It is an object of this invention to implement a filter-changer design which minimizes the overall profile (in x-y-plane) responsible for obstruction, necessary for a specific number of filters. Respectively to maximize the relation of filter area to the outer body's profile.

This invention also provides circular central obstruction (profile in x-y-plane).

It is an object of the invention to eliminate the need for all empty holder (or opening which cannot be used for mounting optical elements) ill order to let the incoming light pass without any interaction with the housed optical elements, thus maximizing the relation of usable optical elements to the needed space.

Another object of the invention is placing the point of gravity as close a possible to the optical and symmetrical axis (z-axis).

It is also an object of the invention to minimize the overall length (in z-direction) to enable the use of the smallest possible optical elements ill combination with optical systems of short focal length (i.e. divergent path of light).

SUMMARY OF THE INVENTION

In order to overcome the problems imposed by prior art filter wheel designs detailed above, this invention implements a filter wheel design whose outer body's profile (in x-y-plane) is circular and centrosymmetric in respect to the path of light (z-axis) of the attached optical devices. This is achieved by arranging the optical filters symmetrically around the central opening for the passing light. The filters are moved into the optical axis and back into parking position by the means of levers (FIG. 4 or linear guidances (FIG. 9) as described in detail in the following section.

By being circular and centrosymmetric in respect to the attached devices optical axis (z-axis), this design minimizes the overall profile of the filter-changer's outer body (in x-y-plane) and thus provides not only minimal, but also circular central obstruction of the incoming light. (FIGS. 4 and 3b) Furthermore the symmetry of the design results in the point of gravity also being very close to the optical axis. This reduces the mechanical stress of the surrounding support structure.

In order to obtain a wide field of view and a short integration time of the image capture device used in conjunction, telescopes often use a short focal length (or in respective a high focal ratio). This results ill a convergent path of light and thus requires the optical filters (or polarizers and so on) to be placed as near as possible to the image capture device's sensor. Otherwise the filters farther from the sensor need to have a larger diameter, resulting in an increased obstruction of incoming light. (refer to diameters 8a and 8b in FIG. 3a This invention improves the image quality by the means of reduced as well as shape optimized obstruction.

It also improves the weight distribution and mechanical length.

In order to optimize weight, reliability and cost, the invention incorporates different mechanisms capable of individually centering the filters on the optical axis.

Optical filters are the major application for the changing device described in this document and hence the further descriptions refer to optical filters in the effort to be consistent. However the further described changing device can also be used to place optical elements other than optical filters (detailed in the next section) into the optical path.

BRIEF DESCRIPTION OF THE DRAWINGS

FIG. 1a Prior art: Front View of prior art filter wheel.
FIG. 1b Prior art: Isometric View of prior art filter wheel.
FIG. 2 Prior art: Centered prior art filter wheel.
FIG. 3a Prior art: Prior art filter wheel mounted on a prime focus telescope.
FIG. 3b Changer for optical elements according to the invention mounted on prime focus telescope.
FIG. 4a Changer for optical elements according to the invention with holder lever moved onto the optical axis.
FIG. 4b Changer for optical elements according to the invention with holder lever moved into parking position.
FIG. 5a Cam groove disk with timing groove.
FIG. 5b Illustration of the cam groove disk steering holder movement.
FIG. 9 Embodiment of the changer for optical elements according to the invention with linear movement of optical elements.

DETAILED DESCRIPTION OF THE PREFERRED EMBODIMENTS

Figure 6:
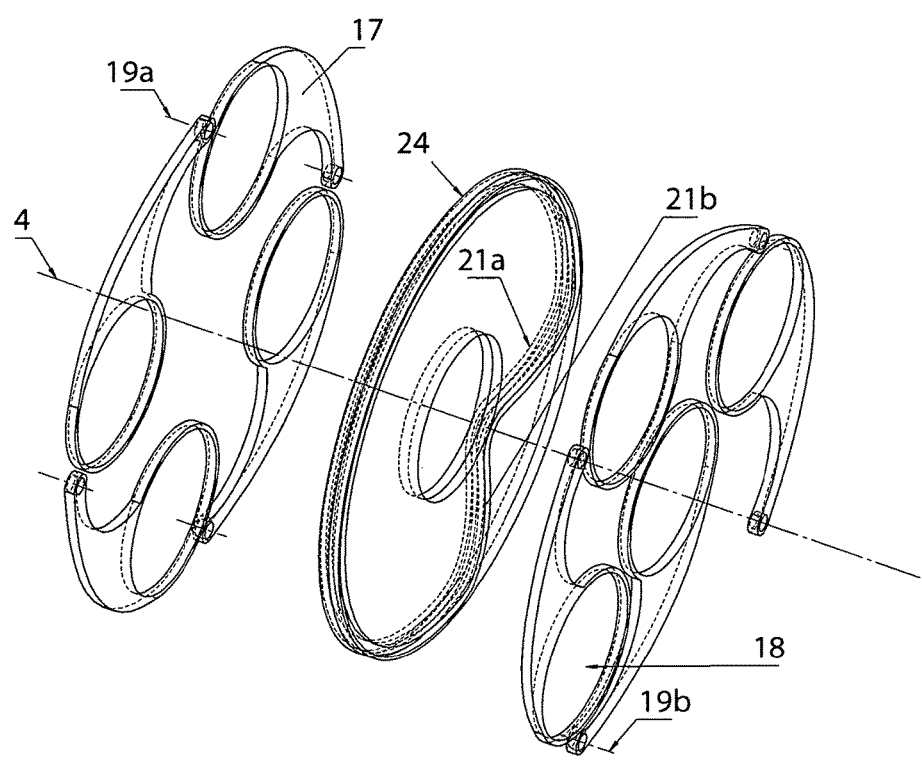
FIG. 6 Exploded view of the changer for optical elements according to the invention.
Figure 7:
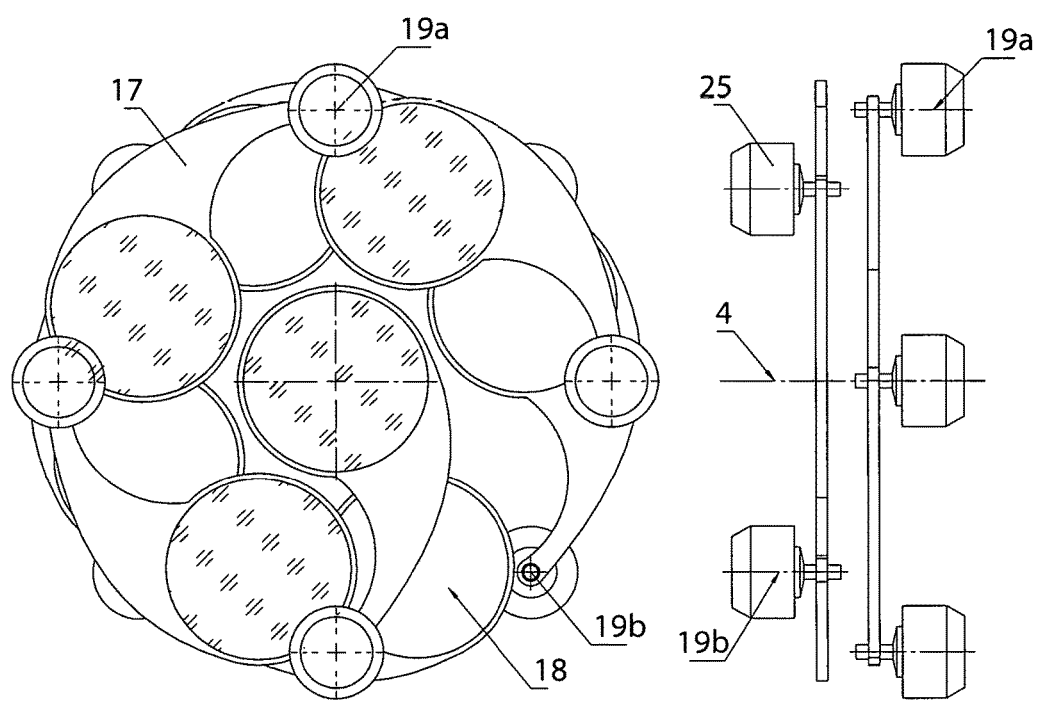
FIG. 7 Embodiment of the changer for optical elements according to the invention with individual lever actuators.
Figure 8:
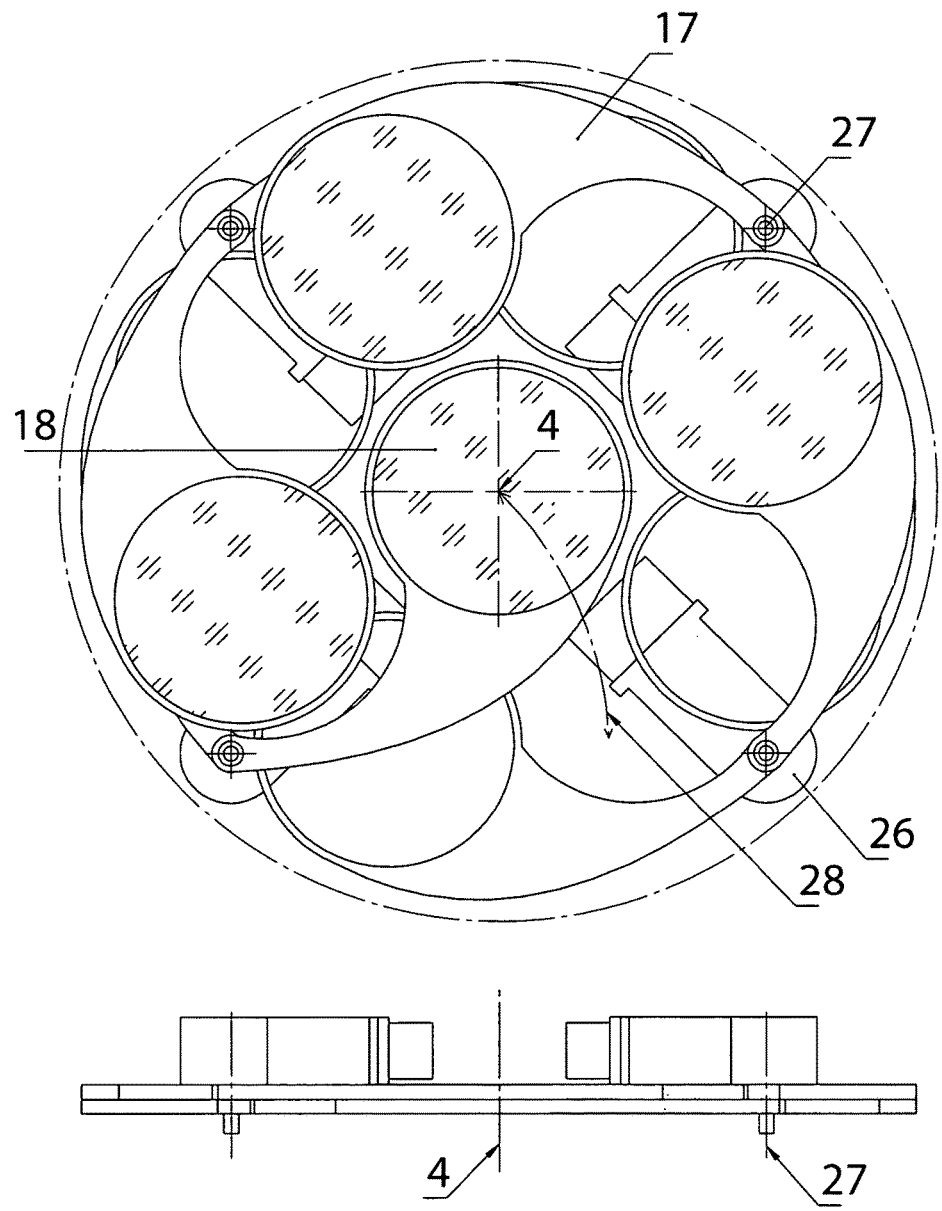
FIG. 8 Embodiment of the changer for optical elements according to the invention with actuators moving two holder levers at once.

The objects of the invention as described can be carried out in different ways.
1. Optical Elements:
   a) Different kinds of optical elements can be used. Polarizers, lenses, field flatteners, wedges or prisms are examples of optical elements that can be used in conjunction with the invention. Optical filters are the most important optical elements for the application and thus the document mostly refers to them in the description of embodiments.
   b) The optical elements can be of various shape. In FIGS. 4 and 9 optical elements with circular and rectangular shape are depicted but other shapes can also be used in the embodiments of this invention.
   c) The number of the optical elements can vary. The preferred embodiments of this invention is restricted to three to five optical elements in one layer. (FIGS. 4 to 9 depict exemplary embodiments incorporating four optical filters for consistency and easier comparison of the different embodiments.)
2. In the interest of minimizing the obstructing profile, while keeping the changing device for optical elements at a reasonable depth, multiple arrays (in x-y-plane) of individually movable holders for optical elements are placed behind each other (on z-axis) (FIGS. 6 and 7).
   a) Using a cam-groove-disk, the individual movement of two holder layers can be carried out by a cam-groove on each side of the disk with a rotational offset. A complementary design would be the same offset between the holder-lever's axis of rotation and a plane symmetric cam-groove-disk as depicted in FIG. 6.
      In order to combine optical elements of different layers, two separate cam-groovedisks i.e. one cam-groove-disk for each layer, is used.
3. The movement of the holders can be rotary or linear. (compare FIGS. 4 to 8 with 9)
   a) The optical elements are mounted in holders, further called 'holder-levers' which can revolve around an axis of rotation in order to move the optical elements into the optical axis and back into parking position (FIGS. 4a) and 4b.
   b) The optical elements are mounted in holders which carry out a linear movement towards the optical axis to move the holders in place. (FIG. 9)
4. The individual movement of the holders may be carried out by different means of actuation.
   a) The holders are moved by rotation.
      Individual actuators mounted on the axis of rotation move the optical elements individually by rotating the holder-levers. This comprises the possibility to combine optical elements of each array if desired (FIG. 7).
      Two holder-levers of different layers mounted on the same axis of rotation but facing opposite directions, i.e. revolving clockwise and counterclockwise are driven by the same actuator (FIG. 8). The holder-levers are retained in parking position by a restoring force i.e. by springs (not depicted in figure). When the actuator revolves counterclockwise, a drive pin on the shaft will push the top holder-lever into the optical axis. By then revolving clockwise, the holder-lever is moved backwards into parking position by the spring. When revolving further than the initial position, the actuator will move the other holder-lever into the optical axis. (note that clockwise and counterclockwise rotation are interchangeable)
      Designs not using springs as a restoring force to move the holders back into parking position but using magnetic actuators (solenoid motors) or electric- or non-electric-magnets are another option to control the position of the levers which hold the optical elements.

Individual linear actuators (not depicted in drawing) move the holders mounted in linear guidings depicted in FIG. 5 into the optical axis and back.

b) The movement of the holders for optical elements is driven by a rotary cam-groove-disk (FIGS. 5 and 6). The groove on the disk represents the timing function which is transmitted to each holder by a pin, wheel, bearing (or other suitable pivot) on the holder. By revolving around the optical axis the cam-groove-disk moves the optical elements into the optical axis and back into parking position one-by-one. The cam-groove-disk is pivot-mounted in the outer body of the changing device for optical elements and driven by a suitable actuator.

5. The actuation of the holders for optical elements or the cam-groove-disk can be carried out by different types of actuators.
   a) Solenoid actuators and stepper motors are suitable for direct actuation of the filter holders. I.e. one actuator for each axis of rotation.
   b) Stepper motors and servo drive motors are suitable for driving the cam-groove-disk by the means of a mechanical transmission. This can be a belt-drive or gear transmission.
6. The changing device as herein before described can also be used to place optical elements other than optical filters into the optical path. Examples of such other optical elements, apart from optical filters, are polarizers, lenses for example such as field flattening lenses, wedges or prisms to compensate for atmospheric refraction and the like.

DETAILED DESCRIPTION OF THE DRAWINGS

FIG. 1: A common prior art filter wheel design. The filter wheel 1 houses a various number of optical filters 2. It is mounted in a way that its rotational axis 4 is parallel to the optical axis 4 of the image-capture-device 6. The individual filters are moved into the optical axis, respectively in front of the detection chip, 5 by rotation of the filter disk. It is clearly seen that the minimal possible obstruction caused by the filter wheel's outer diameter is not centrosymmetric in respect to the optical axis 4.

FIG. 2: A prior art 'centered-filter wheel' design. Two overlapping filter disks 7 and 8 move the optical filters 2 into the optical axis 4 by revolving around their axis of rotation 9a and 9b. One filter holder on each disk is needed to be empty in order not to shadow the other disks filter. This design provides symmetrical but not circular obstruction. Furthermore the obstructing area is unsatisfactorily large and two filter holders are left to be empty. Thus the relation between obstructing area and number of usable filters (i.e. the usable area of housed optical elements) is rather low.

FIG. 3: a) Illustration of the resulting central obstruction (also referred to as central-vignetting) of a prime-focus telescope. When mounted on the camera 6 in the telescope's prime-focus (in front of the primary mirror 11, the prior art filter wheel 10 causes non-symmetric obstruction 13a of the incoming light 14 in respect to the optical axis 4. The diameters 15a and 15b illustrate the need for minimization of the filter-changer's mechanical length, because of the divergent beam of rays.
   b) In contrast to prior art filter wheels the invention 16 provides minimized and circular centrosymmetric obstruction 13b while housing the same number of usable filters without the need for empty holders.

FIG. 4: a) Circular centrosymmetric changer for optical elements with levers 17 for the movement of the holders for the optical elements 18. The individual holders are moved into the optical axis 4 by rotation of the holder-levers 17 around the axis of rotation 19. This movement can either be driven manually or by actuators directly mounted on, or respectively driving the axis of rotation 19. FIG. 3a shows a filter in working position.
   b) The holder moved away from the optical axis 4 (respectively the opening in the center of the filter-changer for the passing through of light) into parking position.

FIG. 5: a) Example of a cam-groove-disk drive for the holder movement. The disk 20 has a cam-groove 21 whose outer maximum diameter resembles the parking position of the holder-levers. The inner minimal diameter resembles the working position for the holder-levers.
   b) The negative-cam-grove-disk's timing function is transmitted to the holder-levers by the means of a pin 22 engaged with the groove 21. One full rotation of the disk in respect to the optical axis 4 will move all holders consecutively into the optical axis and back into parking position. The example demonstrates a design with four holders. Rotation of the cam-groove-disk by angle 23a will result in a rotation of the lever engaged with the varying part of the cam-groove by angle 23b.

FIG. 6: Exploded view of a two layer cam-groove-disk design. This figure depicts a plane-symmetrical cam-groove-disk 24 with an offset of the holder-levers rotational axis 19a and 19b. Rotationally offsetting the timing-grooves 21a and 21b and/or the moving elements 17 enables the system to individually move all elements into the optical axis and back by one full rotation of the cam-groove disks. Different timing-grooves and/or offsets of the grooves and/or elements of different layers, enable the combined use of elements of different layers and/or states where the optical path is clear of movable elements.

FIG. 7: Embodiment with two individual layers of holders for optical elements 17 using individual actuators 25 for each holder-lever.

FIG. 8: Design example using one actuator 26 for each of the four rotational axis 27. Counterclockwise rotation moves 28 the holders in the upper layer into the optical axis. Clockwise rotation moves the lower holders (or vice versa). All filters are moved back into parking position the means of springs (or any other suitable mean of restoring force) when the actuator changes the direction of rotation.

FIG. 9: Design example incorporating linear movement of the holders actuated by a cam-groove-disk and two symmetrical holder arrays on each side of the disk.
   a) The rectangular holder frames 29 are mounted in linear guides 30. The guiding pin 22 is engaged in the cam-groove 21a and moves the holders into the optical axis 4 and back into parking position when the cam-groove-disk 20 rotates.
      The figure also shows the second layer of holders and the second cam-groove 21b which is offset in respect to the optical axis. Rotation of the disks will result in the current working holder being moved into parking position while the next holder (of the second layer) is being moved simultaneously into the optical axis.
   b) Isometric view of a two-layer cam-groove-disk design with rectangular holders for optical elements.

What is claimed:

1. A changing device for optical elements comprising:
an outer body which is circular and centrosymmetric with respect to a central opening that permits the passing through of light;
two or more optical elements that are movably arranged within said outer body in two plane layers, and the optical elements are moved manually or driven by one or more actuators into the central opening;
a cam-groove-disk between the two plane layers;
the cam-groove-disk having a timing-groove on each side of the cam-groove-disk;
where the timing grooves and/or the two plane layers are rotationally offset such that optical elements of different layers are aligned with the central opening at a time, or no more than one optical element is aligned with the central opening at a time.

2. The changing device for optical elements according to claim 1 wherein the optical elements movement is caused by either a linear means for movement of the optical elements or a rotary means for movement of holder-levers on which the optical elements are mounted.

3. The changing device for optical elements according to claim 1 wherein the optical element's movement is made by one or more actuators.

4. The changing device for optical elements according to claim 3, further comprising holder-levers wherein the optical elements are mounted on the holder-levers; wherein two holder-levers of different layers that share an axis of rotation are moved by one actuator.

5. The changing device for optical elements according to claim 1, further comprising three, four, five, six, eight, or ten holders for optical elements.

6. A changing device for optical elements according to claim 1, wherein the outer diameter of the cam-groove-disk is less or equal to 3.5 times the diameter of an optical element.

7. The changing device for optical elements according to claim 1, wherein the optical elements are selected from optical filters, polarizers, lenses, field flatteners, wedges or prisms.

8. A telescope comprising the changing device for optical elements according to claim 1.

* * * * *